(12) United States Patent
Buehler et al.

(10) Patent No.: US 11,044,938 B2
(45) Date of Patent: Jun. 29, 2021

(54) PROCESS AND APPARATUS TO OBTAIN TOBACCO FLAVOR EXTRACTS

(71) Applicant: PHILIP MORRIS PRODUCTS S.A., Neuchatel (CH)

(72) Inventors: Frederic Ulysse Buehler, Neuchatel (CH); Michel Thorens, Moudon (CH); Patrick Charles Silvestrini, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 213 days.

(21) Appl. No.: 15/778,708

(22) PCT Filed: Nov. 25, 2016

(86) PCT No.: PCT/EP2016/078870
§ 371 (c)(1),
(2) Date: May 24, 2018

(87) PCT Pub. No.: WO2017/089576
PCT Pub. Date: Jun. 1, 2017

(65) Prior Publication Data
US 2018/0360101 A1    Dec. 20, 2018

(30) Foreign Application Priority Data
Nov. 27, 2015   (EP) .................................... 15196669

(51) Int. Cl.
*A24B 15/24*   (2006.01)
*B01D 5/00*    (2006.01)
*F25J 1/00*    (2006.01)

(52) U.S. Cl.
CPC ............ *A24B 15/24* (2013.01); *B01D 5/0027* (2013.01); *B01D 5/0057* (2013.01); *F25J 1/0047* (2013.01)

(58) Field of Classification Search
CPC .. A24B 15/24; A24B 3/04; A24B 3/12; A24B 3/02
See application file for complete search history.

(56) References Cited

U.S. PATENT DOCUMENTS

| 1,304,539 A | 5/1919 | Hugo |
| 4,150,677 A * | 4/1979 | Osborne, Jr. .......... A24B 15/24 |
| | | 131/275 |

(Continued)

FOREIGN PATENT DOCUMENTS

| CN | 1120968 | 4/1996 |
| CN | 102499465 | 6/2012 |

(Continued)

OTHER PUBLICATIONS

PCT Search Report and Written Opinion for PCT/EP2016/078870 dated Feb. 1, 2017 (13 pages).

(Continued)

*Primary Examiner* — Eric Yaary
*Assistant Examiner* — Jennifer A Kessie
(74) *Attorney, Agent, or Firm* — Mueting Raasch Group

(57) ABSTRACT

The present invention relates to a process to obtain tobacco flavor extracts, the process comprising: —conditioning a mixture of tobaccos in a primary tobacco manufacture heating the mixture of tobacco to a temperature comprised between about 30 degrees Celsius and about 90 degrees Celsius for a time interval comprised between about 30 seconds and about 1 hour; —recovering emissions produced by the mixture conditioning; and —obtaining at least one flavor extract from the recovered emissions. The present invention also relates to an apparatus to obtain tobacco flavor extracts.

13 Claims, 1 Drawing Sheet

(56) References Cited

U.S. PATENT DOCUMENTS

Figure 1:
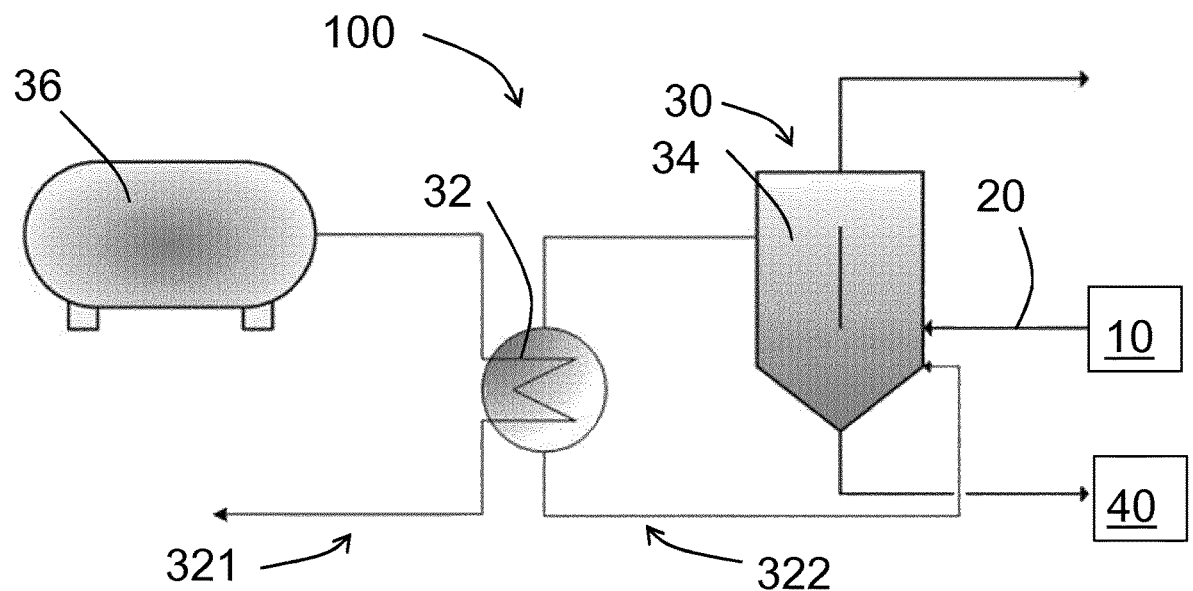

| | | | |
|---|---|---|---|
| 5,182,926 A * | 2/1993 | Carns | A23F 3/426 |
| | | | 62/352 |
| 5,235,992 A | 8/1993 | Sensabaugh | |
| 5,445,169 A | 8/1995 | Brinkley | |
| 7,082,849 B2 | 8/2006 | Chida | |
| 9,022,040 B2 | 5/2015 | Murphy | |
| 10,390,555 B2 | 8/2019 | Fujisawa | |
| 2013/0160777 A1 * | 6/2013 | Murphy | A23L 27/115 |
| | | | 131/297 |
| 2013/0319434 A1 | 12/2013 | Borschke | |

FOREIGN PATENT DOCUMENTS

| | | |
|---|---|---|
| CN | 102781264 | 11/2012 |
| CN | 203555145 | 4/2014 |
| CN | 203789114 | 8/2014 |
| CN | 204550796 | 8/2015 |
| JP | 2002-236079 | 8/2002 |
| WO | WO 2013/180918 | 12/2013 |
| WO | WO 2014/175399 | 10/2014 |

OTHER PUBLICATIONS

Office Action issued in China for Application No. 201680061441.X dated Sep. 15, 2020 (23 pages). English translation included.
Office Action issued in Japan for Application No. 2018-522594 dated Oct. 22, 2020 (15 pages). English translation included.

* cited by examiner

PROCESS AND APPARATUS TO OBTAIN TOBACCO FLAVOR EXTRACTS

This application is a U.S. National Stage Application of International Application No. PCT/EP2016/078870 filed Nov. 25, 2016, which was published in English on Jun. 1, 2017, as International Publication No. WO 2017/089576 A1. International Application No. PCT/EP2016/078870 claims priority to European Application No. 15196669.4 filed Nov. 27, 2015.

The present invention relates to a process and an apparatus to obtain a flavor extract, in particular a tobacco flavor extract, for example to be used in an aerosol-forming article.

The sensory attributes of cigarette smoke can be modified by incorporating flavoring materials into various components of the cigarette. As an example, capsules or beads can be incorporated into components of a cigarette, such as in the filter. Liquid flavorants are also known, which can be sprayed or otherwise introduced in one or more components of the cigarette. In the so-called electronic cigarettes, also known as e-cigarettes, flavoring is also known. The flavor may be liquid and added in a cartridge of the e-cigarette.

Among the possible flavors to be added in smoking articles, tobacco flavors is one of those. Tobacco flavors is particularly used in e-cigarettes, for example to reproduce the smoking sensation had with conventional cigarettes while using an e-cigarette. However, tobacco flavor can be used in other smoking articles as well. One of the possible tobacco flavors contains real tobacco, that is, it is extracted from tobacco.

The process of extraction of flavor from tobacco however is a relatively expensive process and it requires dedicated equipment.

There is therefore a need for a process to obtain a tobacco flavor extract from tobacco which is relatively cheap and does not require a complex dedicated equipment for its extraction.

In a first aspect thereof, the invention relates to a process to obtain tobacco flavor extracts, the process comprising: conditioning a mixture of tobaccos in a primary tobacco manufacture heating the mixture of tobacco to a temperature comprised between about 30 degrees Celsius and about 90 degrees Celsius for a time interval comprised between about 30 seconds and about 1 hour; recovering emissions produced by the mixture conditioning; and obtaining at least one flavor extract from the recovered emissions.

Advantageously, the tobacco flavor extracts are obtained from the primary tobacco manufacture, in particular from the emissions generated in the primary tobacco manufacture. The process may lead to the realization of combustible tobacco products, for example cigarettes, or to the realization of a homogenized tobacco sheet, such as a cast sheet. In this way, a complex dedicated equipment for the extraction of tobacco flavor extracts may not be requested any more.

Indeed, the process according to the invention uses the emissions which are always generated in at least one step of the primary tobacco manufacture, that is, such emissions are always generated when tobacco is treated in a conventional primary tobacco manufacture. The emissions that comes from the treatment of tobacco in the primary tobacco manufacture are at least partially captured, so that also the waste of the primary tobacco manufacture is advantageously limited. A byproduct of the primary processing (that is, the primary tobacco manufacture) for the realization of a type of aerosol-forming article, byproduct often considered a harmful waste product, becomes a component of a different aerosol-forming article.

With the process of the invention, a number of advantages may be achieved.

The waste of the primary tobacco manufacture may be re-used, while before the invention it was typically thrown away, after an expensive treatment thereof, in order to limit the tobacco odor inside and outside the factory. Tobacco odor in the emissions of a conventional factory may be a concern for production facilities. The quantitative olfactometry profiles of different emissions sources show that, for example, a raw tobacco direct conditioning step generates approximately 50 percent of odor load for only 5 percent of total air emissions volume. In particular, for example in the case wherein a Direct Conditioning Cylinder (DCC) is used to condition the mixture of tobacco leaves, stems and lamina, the emissions are characterized by about 4000-5000 odor units each cubic meter and about 50-60 parts per million of Volatile Organic Compounds (VOCs) expressed in methane equivalent, which represent around 500 parts per million on a volumetric basis. The emissions are predominantly nicotine with molecular weight about 10 times that of methane.

In the present application, the odor units are those defined in the European Committee for Standardization (CEN) standard, in particular the CEN standard referring to the measurement of odor emission using dynamic olfactometry.

Typical direct conditioning cylinder exhaust volumes range between about 1000-1500 cubic meters each hour, which is relatively a "large amount" of emissions which can be reused according to the invention to obtain tobacco flavor extracts to be used in an aerosol-forming article. Although a direct conditioning cylinder has been mentioned, the present invention may be used in connection with any conditioning chamber in which the emissions of tobacco during the primary conditioning process can be at least partially confined and collected.

Aerosol forming articles according to the present invention may be in the form of filter cigarettes or other smoking articles in which tobacco material is combusted to form smoke. The present invention additionally encompasses articles in which tobacco material is heated to form an aerosol, rather than combusted, and articles in which a nicotine-containing aerosol is generated from a tobacco material, tobacco extract, or other nicotine source, without combustion or heating. These articles in which aerosol is formed without combustion or where smoke is produced by combustion are in general called "aerosol-forming articles". Aerosol forming articles according to the invention may be whole, assembled aerosol forming articles or components of aerosol forming articles that are combined with one or more other components in order to provide an assembled article for producing an aerosol, such as for example, the consumable part of a heated smoking device.

As used herein, aerosol forming article is any article that generates an inhalable aerosol when an aerosol forming substrate is heated. The term includes articles that comprise an aerosol forming substrate that is heated by and external heat source, such as an electric heating element. An aerosol forming article may be a non-combustible aerosol forming article, which is an article that releases volatile compounds without the combustion of the aerosol-forming substrate. An aerosol forming article may be a heated aerosol forming article, which is an aerosol forming article comprising an aerosol forming substrate that is intended to be heated rather than combusted in order to release volatile compounds that can form an aerosol. The term includes articles that comprise an aerosol forming substrate and an integral heat source, for example a combustible heat source.

An aerosol forming article may be an article that generates an aerosol that is directly inhalable into a user's lungs through the user's mouth. An aerosol forming article may resemble a conventional smoking article, such as a cigarette and may comprise tobacco. An aerosol forming article may be disposable. An aerosol forming article may alternatively be partially-reusable and comprise a replenisheable or replaceable aerosol forming substrate.

An aerosol forming article may also include a combustible cigarette.

More preferably, the tobacco flavor extract obtained by the method of the present invention is used in a cartridge of an e-cigarette. Conditioning is typically one of the first steps in tobacco processing, in particular is often the first process step where the dry raw tobacco is exposed to heat and humidity to open and flexibilize its structure for further treatments. For example, steam and hot water are sprayed in a counter current manner on the tobacco. This is performed as the tobacco is usually dry and brittle, so that this operation moistens the tobacco and makes it workable. The conditioning is generally performed in a conditioning chamber, such as for example in a direct conditioning cylinder, so that in a closed environment humidity, pressure, temperature or any other characteristic of the surrounding of the tobacco can more easily controlled than in an open environment.

Amounts of very fine and very light flavor compounds as well as some nicotine are somehow "washed out" from the tobacco during this first conditioning step. The heat supplied to the tobacco may produce strong odors, smells and releases nicotine and other volatiles into the air, which leave the factory as waste.

In the prior art, this waste is typically treated with expensive abatement technologies to avoid odor complaints. With the process of the invention, the emissions may instead be re-used to obtain the tobacco flavor extracts, so that less odor complaints and less odor outside the factory may be obtained. In addition, healthier and better factoring working conditions for the workers may also be achieved.

For a conventional factory of medium size, for example processing between about 20 and about 30 billion cigarettes per annum, with the process of the invention, it may be possible to recover between about 7 and about 10 kilogram of pure tobacco volatiles concentrate daily.

With the process of the invention, an environmental issue may be minimized by turning waste into high value products, such as tobacco flavor extracts.

Preferably, the process to obtain tobacco flavor extracts of the present invention comprises adding the flavor extract to a component of an aerosol-forming article. This aerosol-forming article may include an e-cigarette, so that the extract can be used in a respective cartridge for an e-cigarette, or it may be used in a homogenized tobacco material to be heated in order to enhance the overall tobacco flavor.

Preferably, the step of conditioning a mixture of takes place in a conditioning chamber, more preferably in a direct conditioning cylinder. The conditioning chamber may allow a better control over the characteristics of the environment surrounding the tobacco mixture. Preferably, humidity, pressure or temperature are better controlled. A direct conditioning cylinder treatment can be assimilated to tobacco steam stripping, some sort of distillation process, in which the different types of tobacco (for example Burley, Flue-cured, Oriental, and Reconstituted tobaccos) are treated separately. This means that the respective different emissions may also be recovered separately, leaving room for a possible optional further blending and composition adjustment. The process of the invention for the realization of a tobacco flavor extract may involve also a step of mixing different extracts obtained from different tobacco types, in order to obtain the desired final flavor, as performed with the blending of different types of tobaccos in the conventional products, such as cigarettes and cigars.

The steps of conditioning includes heating the mixture of tobacco to a temperature comprised between about 30 degrees Celsius and about 90 degrees Celsius for a time interval comprised between about 30 seconds and about 1 hour. More preferably, the heating of the mixture of tobacco is such that the mixture of tobacco reaches a temperature between about 40 degrees Celsius and about 80 degrees Celsius, more preferably between 50 degrees Celsius and 70 degrees Celsius. This temperature of the mixture of the tobacco is kept for a time interval comprised preferably between about 30 seconds and about 1 hour, more preferably between about 1 minute and about 30 minutes, even more preferably between 1 minute and 10 minutes.

Preferably, the step of recovering emissions produced by the mixture conditioning comprises recovering emissions produced in the conditioning chamber and exiting the cylinder by means of an exhaust pipe. It is preferred to use for the process of the invention the standard equipment already present in the primary manufacturing line, such as the conditioning chamber and its connecting pipes, so that there is no need of extensive modifications of the machines, reducing the overall costs of production of the tobacco extracts.

Advantageously, the process to obtain tobacco flavor extracts of the present invention comprises recovering emissions produced by the mixture conditioning of a single type of tobacco. The emissions and the flavor recovered by the emissions may generate extracts having different flavor depending on the type of tobacco which generated the emission. In order to have control on the final flavor, preferably emission from conditioning of a single tobacco type are recovered.

Tobacco types comprise one or more of the following tobaccos: bright tobacco; dark tobacco; aromatic tobacco; filler tobacco. Preferably, the homogenized tobacco material is formed by tobacco lamina and stem of different tobacco types, which are properly blended. With the term "tobacco type" one of the different varieties of tobacco is meant. With respect to the present invention, these different tobacco types are distinguished in three main groups of bright tobacco, dark tobacco and aromatic tobacco. The distinction between these three groups is based on the curing process the tobacco undergoes before it is further processed in a tobacco product.

Bright tobaccos are tobaccos with a generally large, light coloured leaves. Throughout the specification, the term "bright tobacco" is used for tobaccos that have been flue cured. Examples for bright tobaccos are Chinese Flue-Cured, Flue-Cured Brazil, US Flue-Cured such as Virginia tobacco, Indian Flue-Cured, Flue-Cured from Tanzania or other African Flue Cured. Bright tobacco is characterized by a high sugar to nitrogen ratio. From a sensorial perspective, bright tobacco is a tobacco type which, after curing, is associated with a spicy and lively sensation. According to the invention, bright tobaccos are tobaccos with a content of reducing sugars of between about 2.5 percent and about 20 percent of dry weight base of the leaf and a total ammonia content of less than about 0.12 percent of dry weight base of the leaf. Reducing sugars comprise for example glucose or fructose. Total ammonia comprises for example ammonia and ammonia salts.

Dark tobaccos are tobaccos with a generally large, dark coloured leaves. Throughout the specification, the term "dark tobacco" is used for tobaccos that have been air cured. Additionally, dark tobaccos may be fermented. Tobaccos that are used mainly for chewing, snuff, cigar, and pipe blends are also included in this category. From a sensorial perspective, dark tobacco is a tobacco type which, after curing, is associated with a smoky, dark cigar type sensation. Dark tobacco is characterized by a low sugar to nitrogen ratio. Examples for dark tobacco are Burley Malawi or other African Burley, Dark Cured Brazil Galpao, Sun Cured or Air Cured Indonesian Kasturi. According to the invention, dark tobaccos are tobaccos with a content of reducing sugars of less than about 5 percent of dry weight base of the leaf and a total ammonia content of up to about 0.5 percent of dry weight base of the leaf.

Aromatic tobaccos are tobaccos that often have small, light coloured leaves. Throughout the specification, the term "aromatic tobacco" is used for other tobaccos that have a high aromatic content, for example a high content of essential oils. From a sensorial perspective, aromatic tobacco is a tobacco type which, after curing, is associated with spicy and aromatic sensation. Example for aromatic tobaccos are Greek Oriental, Oriental Turkey, semi-oriental tobacco but also Fire Cured, US Burley, such as Perique, Rustica, US Burley or Meriland.

Additionally, a blend may comprise so called filler tobaccos. Filler tobacco is not a specific tobacco type, but it includes tobacco types which are mostly used to complement the other tobacco types used in the blend and do not bring a specific characteristic aroma direction to the final product. Examples for filler tobaccos are stems, midrib or stalks of other tobacco types. A specific example may be flue cured stems of Flue Cured Brazil lower stalk.

Within each type of tobaccos, the tobacco leaves are further graded for example with respect to origin, position in the plant, colour, surface texture, size and shape. These and other characteristics of the tobacco leaves are used to form a tobacco blend. A blend of tobacco is a mixture of tobaccos belonging to the same or different types such that the tobacco blend has an agglomerated specific characteristic. This characteristic can be for example a unique taste or a specific aerosol composition when heated or burned. A blend comprises specific tobacco types and grades in a given proportion one with respect to the other.

A single tobacco type therefore means a single one of the tobaccos among bright tobacco; dark tobacco; aromatic tobacco. However, within a single tobacco type, different grades can be used.

Different grades within the same tobacco type may be cross-blended to reduce the variability of each blend component. For example, bright tobacco may comprise tobacco of grade A, tobacco of grade B and tobacco of grade C. Bright tobacco of grade A has slightly different chemical characteristics to bright tobacco of grade B and grade C. Aromatic tobacco may include tobacco of grade D and tobacco of grade E, where aromatic tobacco of grade D has slightly different chemical characteristics to aromatic tobacco of grade E.

Preferably, the process to obtain tobacco flavor extracts of the present invention comprises supplying a plurality of different types of tobaccos; separately recovering emissions produced by the mixture conditioning of each different type of tobacco; obtaining a flavor extract for each separated emission; and blending the flavor extracts obtained from the different types of tobaccos. A generation of a flavor blending of different extracts may allow a very fine control on the final flavor.

A preliminary step before the blending may be to investigate the different characteristics, such as chemical composition, toxicological characteristics, subjective potential, etc. of different tobaccos. Knowing these characteristics, it is possible to prepare a composition of a desired blend of extracts on the basis of a final characteristic to be achieved. Since flavor extracts can be recovered separately for each tobacco type, it is possible to define specific "recipes" for flavor having given characteristics. This preferably may also allow consistency and reproducibility of the flavors obtained.

Preferably, the step of obtaining at least one flavor extract from the recovered emissions comprises condensing the emissions to obtain at least one condensed emission as said at least one flavor extract. In the case of a conditioning chamber treatment, the vapors from an exhaust pipe are condensed in a condenser to recover flavor compounds. Exhaust vapors are chilled in the condenser and the resulting distillate is collected. In such "distillation" process, the tobacco volatile compounds stripped from raw tobaccos remains unchanged. Preferably, equipment already used in the primary processing line may be used. Activated carbon adsorption may also be used for obtaining at least one flavor extract from the recovered emissions. However the activated carbon adsorption option may be more complex and costly, requiring solvent extraction for the recovery process. In addition, it may give a specific "activated carbon" flavor to the extracts, because it leads to a selective adsorption of specific compounds. Therefore, recovering the volatiles adsorbed onto the carbon may be energy intensive and expensive.

Preferably, condensing the emissions includes condensing the emission by cryogenic condensation. Cryogenic condensation is a known process that allows recovery of volatile organic compounds for reuse. In addition, cryogenic condensation may be selected because at the moment is the best achievable control technology by environmental regulators for volatile organic compound control in other processes. This process is based on cooling the emissions up to very low temperatures, using liquid nitrogen or other cryogenic fluid as source of cold, separating the pollutants by decreasing the vapor pressure as function of vapor/liquid and vapor/solid equilibrium. Any volatile emissions is cryogenically condensed. Cryogenic condensation is based on the principle that volatile organic compounds condense at low temperatures. By cooling the waste gas of the direct conditioning cylinder up to temperatures below the dew point the solvent vapor condenses on a cooling surface and can be removed in liquid form. The lower the temperature the greater the flavor extracts from the recovered emissions.

When removing a mixture of organic compounds from the emissions of the conditioning chamber, the minimum operating temperature is set by the most volatile constituent. Liquid nitrogen with its boiling point of −196 degrees Celsius is highly suitable as a cooling source for such tasks. The condensation process requires very low temperatures so that volatile organic compounds can be condensed.

Preferably, the process to obtain tobacco flavor extracts of the present invention comprises lowering the temperature of the emissions to below about −30 degrees Celsius. Traditionally, Chloro-Fluoro-Carbon (CFC) refrigerants like CFC-12 may be used to condense the volatile organic compounds. Liquid nitrogen may be a viable substitute of chloro-fluoro-carbon for use in the extremely low-temperature or cryogenic condensation process. Cryogenic has the meaning of a temperature of below −160 degrees Celsius. Cryogenic condensation is preferred to exhaust streams with low flow-rates, that is flow-rates below about 3000 cubic meters each hour, or vapor concentrations around about 100 parts per million on a volumetric basis. Cryogenic condensation may be a versatile process. Typically, condensation takes place with liquid nitrogen as the refrigerant in a straightforward heat exchange process. Non-toxic, non-corrosive, and non-flammable liquid nitrogen is a versatile, zero Ozone-Depleting Substance (ODS) coolant with a normal boiling point of −196 degrees Celsius. Cryogenic condensation is preferably performed on one or a series of plate-fin or shell-and-tube heat exchangers. The volatile organic compound stream and the liquid nitrogen stream may flow through the heat exchanger in a counter current manner, maximizing heat transfer.

Preferably, the process to obtain tobacco flavor extracts of the present invention comprises collecting droplets of condensed emissions. As an example, in the above-mentioned case of plate-fin or shell-and-tube heat exchangers, the volatile organic compound may condense on a shell side of the heat exchanger then drains into a collection tank, obtaining the flavor extracts. As the organic-laden vapor stream is cooled, volatile organic compounds condense when the dew point is reached. Fluctuations in volatile organic compound stream velocity or content may be easily handled by quick response controls on liquid nitrogen flow in the heat exchanger.

Preferably, in addition to or in alternative to the above-mentioned heat exchanger, the process to obtain tobacco flavor extracts of the present invention comprises injecting liquid nitrogen into the emissions. Typically, the only constraint on the volatile organic compound itself is that its freezing point is preferably below about −30 degrees Celsius. Otherwise, freezing is likely to occur and a solid buildup may blanket the heat transfer area and thus reduce the efficiency of the process. A way to overcome this constraint may be to use direct injection of liquid nitrogen into the emissions. Liquid nitrogen may be sprayed on the incoming gas. The liquid nitrogen supply is preferably controlled to meet the desired chamber temperature. Condensation droplets are preferably collected by a fine mesh filter and recovered in a pot at the bottom.

Preferably, the step of conditioning a mixture of tobaccos comprises one or more of: supplying heat to the mixture; supplying steam to the mixture; supplying water at a temperature of between about 10 degrees Celsius and about 80 degrees Celsius to the mixture. More preferably, the step of conditioning a mixture of tobaccos includes heating the mixture of tobaccos by water steam. Preferably the temperature of the water steam is comprised between about 100 degrees Celsius and about 120 degrees Celsius.

Preferably, the step of conditioning a mixture of tobaccos includes conditioning a mixture of tobacco leaves, stems and lamina.

Preferably, the step of conditioning a mixture of tobaccos includes increasing the degree of moisture of the tobacco during heating. Due to the fact that preferably the heating is performed by water steam, the content of water present into the mixture of tobaccos increases while heating.

In a second aspect thereof, the invention relates to an apparatus to obtain tobacco flavor extracts, the apparatus comprising: a conditioning chamber adapted to condition a mixture of tobacco in a tobacco primary manufacturing line, the conditioning chamber including an exhaust pipe adapted to exhaust emissions from the conditioned mixture, the conditioning chamber including heating means adapted to heat the mixture of tobacco to a temperature comprised between about 30 degrees Celsius and about 90 degrees Celsius for a time interval comprised between about 30 seconds and about 1 hour; a condensation system fluidly connected to the exhaust pipe, adapted to lower the temperature of the exhaust emissions so as to condense the exhaust emissions; and a collector in fluid communication to the condensation system adapted to collect the emissions condensed in the condensation system.

Preferably, said condensation system is a cryogenic condensation system including a heat exchanger adapted to exchange heat with the emissions.

Preferably, the apparatus to obtain tobacco flavor extracts of the present invention comprises a liquid nitrogen tank and a nozzle adapted to spray the liquid nitrogen contained in the tank towards the emissions.

The advantages of the second aspect of the invention have been already outlined with reference to the first aspect and therefore will not be herein repeated.

In an additional aspect thereof, the invention relates to a process to obtain tobacco flavor extracts, the process comprising: conditioning a mixture of tobacco leaves, stems and lamina in a primary tobacco manufacture; recovering emissions produced by the mixture conditioning; and obtaining at least one flavor extract from the recovered emissions.

In an additional aspect thereof, the invention relates to an apparatus to obtain tobacco flavor extracts, the apparatus comprising: a conditioning chamber adapted to condition a mixture of tobacco leaves, stems and lamina in a tobacco primary manufacturing line, the direct conditioning chamber including an exhaust pipe adapted to exhaust emissions from the conditioned mixture; a condensation system fluidly connected to the exhaust pipe, adapted to lower the temperature of the exhaust emissions so as to condense the exhaust emissions; and a collector in fluid communication to the condensation system adapted to collect the emissions condensed in the condensation system.

Figure 2:
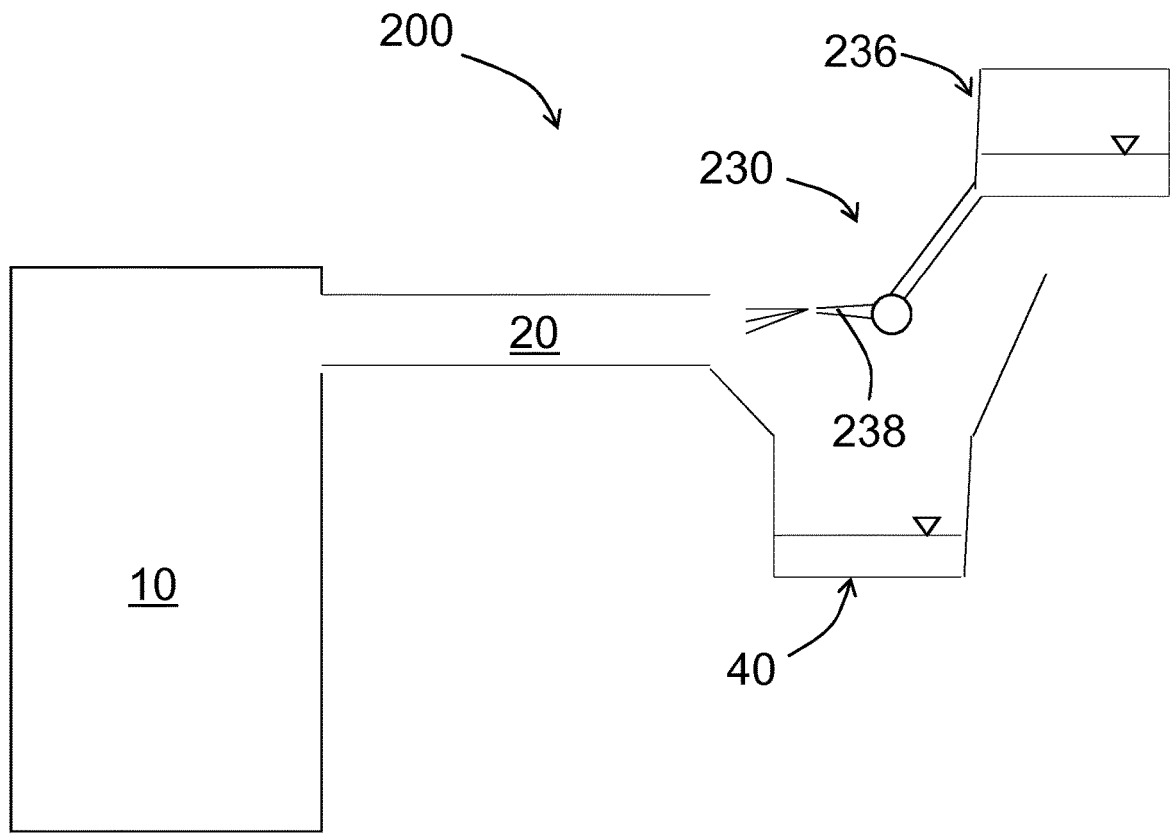

Further advantages of the invention will become apparent from the detailed description thereof with no-limiting reference to the appended drawings:

FIG. 1 is a schematic lay-out view of a first embodiment of an apparatus to obtain tobacco flavor extracts according to the present invention; and FIG. 2 is a schematic lay-out view of a second embodiment of an apparatus to obtain tobacco flavor extracts according to the present invention.

In particular, FIG. 1 shows a first embodiment of an apparatus to obtain tobacco flavor extracts is globally indicated with reference number 100.

The apparatus 100 comprises a direct conditioning cylinder 10 adapted to condition a mixture of tobacco leaves, stems and lamina in a tobacco primary manufacturing line.

In the direct conditioning cylinder 10 a dry mixture of tobacco leaves, stems and lamina is exposed to heat and humidity to open and flexibilize its structure for further treatments. For example, steam and hot water are sprayed in a counter current manner on the mixture of tobacco leaves, stems and lamina.

The direct conditioning cylinder 10 includes an exhaust pipe 20. The exhaust pipe 20 is adapted to exhaust emissions from the conditioned mixture.

The apparatus 100 comprises also a condensation system 30. The condensation system 30 is fluidly connected to the exhaust pipe 20. The condensation system 30 is adapted to lower the temperature of the exhaust emissions so as to condense the exhaust emissions.

The apparatus 100 comprises also a collector 40. The collector 40 is in fluid communication to the condensation system 30. The collector 40 is adapted to collect the emissions condensed in the condensation system 30.

The condensation system 30 is a cryogenic condensation system. The cryogenic condensation system includes a heat exchanger 32 which is adapted to exchange heat with the emissions. The cryogenic condensation system is based on cooling the emissions up to very low temperatures, using liquid nitrogen or other cryogenic fluid as source of cold. The cryogenic condensation system comprises a tobacco flavor extracts separator 34 and a cryogenic fluid tank 36, containing liquid nitrogen or other cryogenic fluid.

The heat exchanger 32 comprises a primary circuit 321 and a secondary circuit 322. The primary circuit 321 is in fluid communication with the cryogenic fluid tank 36. In the primary circuit 321 the primary cooling liquid flows. The primary cooling liquid is for example liquid nitrogen. Downstream the heat exchanger 32, the liquid nitrogen can be discharged in atmosphere (as shown in FIG. 1; in this case, the primary circuit 321 is an open circuit), or it can be recovered (in this case, the primary circuit 321 is a closed circuit). The secondary circuit 322 is preferably a closed circuit. The secondary circuit 322 is in fluid communication with the separator 34. In the secondary circuit 322 the secondary cooling liquid flows. The secondary cooling liquid is for example a known cooling liquid in the art.

The exhaust pipe 20 is in fluid communication with the separator 34, so that the emissions of the direct conditioning cylinder 10 are condensed, obtaining the tobacco flavor extracts. The separator 34 is in fluid communication with the collector 40, wherein the tobacco flavor extracts are collected.

Clean gas is discharged in atmosphere.

With reference to FIG. 2, a second embodiment of an apparatus to obtain tobacco flavor extracts is globally indicated with reference number 200.

The components of the apparatus to obtain tobacco flavor extracts 200 of FIG. 2 which are similar to, or have an analogous function with respect to, those of the apparatus to obtain tobacco flavor extracts 100 of FIG. 1 are indicated with the same reference number.

The apparatus 200 comprises a direct conditioning cylinder 10 adapted to condition a mixture of tobacco leaves, stems and lamina in a tobacco primary manufacturing line.

The direct conditioning cylinder 10 includes an exhaust pipe 20. The exhaust pipe 20 is adapted to exhaust emissions from the conditioned mixture.

The apparatus 100 comprises also a condensation system 230. The condensation system 230 is fluidly connected to the exhaust pipe 20. The condensation system 230 is adapted to lower the temperature of the exhaust emissions so as to condense the exhaust emissions.

The apparatus 200 comprises also a collector 40. The collector 40 is in fluid communication to the condensation system 230. The collector 40 is adapted to collect the emissions condensed in the condensation system 230.

The condensation system 230 comprises a liquid nitrogen tank 236 and a nozzle 238 adapted to spray or inject the liquid nitrogen contained in the tank 236 towards the emissions. In other words, a direct injection of liquid nitrogen into the emissions is used to condensate the emissions. The liquid nitrogen supply is preferably controlled to meet the desired temperature at the output of the exhaust pipe 20. Condensation droplets of tobacco flavor extracts can be collected by a fine mesh filter (not illustrated in FIG. 2) and recovered in the collector 40.

The operation of the apparatus to obtain tobacco flavor extracts 100 and 200 are clear from the description above.

In the apparatus to obtain tobacco flavor extracts 100 and 200 is carried out a process to obtain tobacco flavor extracts, which comprises: conditioning a mixture of tobaccos, such as a mixture of tobacco leaves, stems and lamina, in a primary tobacco manufacture, such as the direct conditioning cylinder 10; recovering emissions produced by the mixture conditioning; and obtaining at least one flavor extract from the recovered emissions. The conditioning takes place heating the mixture of tobaccos by means of a water steam heated at about 120 degrees Celsius, so that the temperature of the mixture of tobaccos reaches a temperature of about 60 degrees Celsius and this temperature of the mixture of tobaccos is kept for about 5 minutes.

The invention claimed is:

1. Process to obtain tobacco flavor extracts, the process comprising:
    conditioning a mixture of tobaccos in a primary tobacco manufacture and heating the mixture of tobacco to a temperature comprised between about 30 degrees Celsius and about 90 degrees Celsius for a time interval comprised between about 30 seconds and about 1 hour;
    recovering emissions produced by the mixture conditioning; and
    obtaining at least one flavor extract from the recovered emissions;
    wherein conditioning a mixture of tobaccos includes increasing the degree of moisture of the tobacco during heating.

2. The process according to claim 1, comprising:
    adding the flavor extract to a component of an aerosol-forming article.

3. The process according to claim 1, wherein the step of conditioning a mixture of tobaccos takes place in a conditioning chamber.

4. The process according to claim 3, wherein the step of recovering emissions produced by the mixture conditioning comprises:
    recovering emissions produced in the conditioning chamber and exiting the cylinder by means of an exhaust pipe.

5. The process according to claim 1, comprising:
    recovering emissions produced by the mixture conditioning of a single type of tobacco.

6. The process according to claim 1, comprising:
    supplying a plurality of different types of tobaccos;
    separately recovering emissions produced by the mixture conditioning of each different type of tobacco;
    obtaining a flavor extract for each separated emission; and
    blending the flavor extracts obtained from the different types of tobaccos.

7. The process according to claim 1, wherein the step of obtaining at least one flavor extract from the recovered emissions comprises:
    condensing the emissions to obtain at least one condensed emission as said at least one flavor extract.

8. The process according to claim 7, wherein condensing the emissions includes:
    condensing the emission by cryogenic condensation.

9. The process according to claim 7, comprising:
    lowering the temperature of the emissions to below about −30 degrees Celsius.

10. The process according to claim 7, comprising:
    injecting liquid nitrogen into the emissions.

11. The process according to claim 7, comprising:
    collecting droplets of condensed emissions.

12. The process according to claim 1, wherein the step of conditioning a mixture of tobacco comprises one or more of:

supplying heat to the mixture;
supplying steam to the mixture;
supplying water at a temperature of between about 10 degrees Celsius and about 80 degrees Celsius to the mixture.

13. The process according to claim 1, wherein conditioning a mixture of tobaccos includes conditioning a mixture of tobacco leaves, stems and lamina.

* * * * *